Patented Feb. 16, 1943

2,311,585

UNITED STATES PATENT OFFICE 2,311,585

PARASITICIDE

William P. ter Horst, Packanack Lake, N. J., assignor to United States Rubber Company, New York, N. Y., a corporation of New Jersey No Drawing. Application August 23, 1941, Serial No. 408,109

4 Claims. (Cl. 167—30)

This invention relates to parasiticidal compositions, and more particularly to parasiticidal compositions which may be employed as either fungicides or insecticides, the latter referring to both insect toxicants and insect repellents.

The compositions according to the present invention are unusual in that it is rare for a chemical to exhibit outstanding characteristics both as a fungicide and as an insecticide.

The parasiticides of the present invention include salts of N-aryl hydroxylamines with organic or inorganic acids, particularly with carboxylic acids. Examples are N-phenyl hydroxylamine oxalate—a stable crystalline material which may be prepared according to U. S. Patent No. 1,390,260; and N-naphthyl hydroxylamine oxalate; N-tolyl hydroxylamine oxalate; 2,6-dimethylphenyl hydroxylamine oxalate; 2,4,6-trimethylphenyl hydroxylamine oxalate.

As a fungicide, phenyl hydroxylamine oxalate is outstanding. Furthermore, it has proved to be a strong toxicant for insects, and likewise to be an effective insect repellent. The tests in the "Table of fungicidal action" below show the effectiveness of this compound as a fungicide.

Salts of the aryl hydroxylamines with other acids may likewise be used, such as, for example, as the sulfate, thiocyanate, acetate, phthalate, tannate, etc. of phenyl hydroxylamine.

The phenyl hydroxylamine oxalate was tested by spraying a 5% aqueous solution thereof on Mexican bean beetles. It was found to have both poisonous and repellent effects on the beetles.

The tests tabulated demonstrate the effectiveness of the new parasiticides when employed exclusively as fungicides, as in preventing spore germination.

Table of fungicidal action

An aqueous solution of the chemical to be tested containing 5 grams thereof per liter of water was prepared. The solution was sprayed on glass slides prepared by coating with nitrocellulose. An atomizer, capable of delivering 10 cc. of spray liquid in 36 seconds, was used. A glass slide was positioned 2 feet away from the nozzle of the atomizer. Spraying was carried out for periods, respectively, of 3, 5½, 8, 10½ and 13 seconds. The spray deposit was allowed to dry. The test organism, for example, Macrosporium Sarcinaeformae, was then placed on the sprayed slides and germination was allowed to take place in a moist chamber at 25° C. The table shows the percent germination on untreated slides as compared with treatments according to the invention:

| Chemical treatment | Percentage germination | | | | |
|---|---|---|---|---|---|
| | 3″ | 5½″ | 8″ | 10½″ | 13″ |
| None (control) | 99.0 | 99.0 | 99.0 | 99.0 | 99.0 |
| Phenyl hydroxylamine oxalate | 13.3 | 05.0 | 01.7 | 02.0 | 02.3 |

Spore germination will also be retarded or prevented in the case of other fungi, such as Fusarium, Phythium, Rhizoctonia, etc.

The chemicals may be used in the form of sprays or dusts, alone or in combination with one another or with other fungicides or insecticides, or in combination with fertilizers or with suitable auxiliary agents such as wetting agents, sticking agents, spreading agents and the like. Their advantages are especially apparent, however, when used as plant sprays or powders alone, since they serve the twofold purpose of fungicide and insecticide (toxicant and repellent) and thereby may eliminate the necessity for complicated or costly mixtures or a series of applications of different types of chemical parasiticides.

The application of the various chemicals as parasiticides may be in dilute or suspended form in water or other vehicle, or mixed with talc, clay and the like, or as described above in admixture with other chemicals.

Having thus described my invention, what I claim and desire to protect by Letters Patent is:

1. A fungicidal and insecticidal preparation containing as an active essential ingredient a salt of an N-aryl hydroxylamine with an acid.
2. A fungicidal and insecticidal preparation containing as an active essential ingredient a salt of an N-aryl hydroxylamine with an organic acid.
3. A fungicidal and insecticidal preparation containing as an active essential ingredient a salt of an N-aryl hydroxylamine with an inorganic acid.
4. A fungicidal and insecticidal preparation containing as an active essential ingredient N-phenyl hydroxylamine oxalate.

WILLIAM P. TER HORST.